(12) United States Patent
Prinz et al.

(10) Patent No.: US 8,939,129 B2
(45) Date of Patent: Jan. 27, 2015

(54) GAS MIXER, GAS MIXING SYSTEM, GAS ENGINE

(75) Inventors: Johannes Prinz, Friedrichshafen (DE); Manolo Odermatt, Houston, TX (US); Anko Ernst, Salem (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 14/118,633

(22) PCT Filed: May 15, 2012

(86) PCT No.: PCT/EP2012/002081
§ 371 (c)(1),
(2), (4) Date: Dec. 23, 2013

(87) PCT Pub. No.: WO2012/156077
PCT Pub. Date: Nov. 22, 2012

(65) Prior Publication Data
US 2014/0102422 A1    Apr. 17, 2014

(30) Foreign Application Priority Data

May 19, 2011   (DE) .................... 10 2011 076 106

(51) Int. Cl.
*F02M 33/02*         (2006.01)
*F02M 35/10*         (2006.01)
(Continued)

(52) U.S. Cl.
CPC ............. *F02M 35/10* (2013.01); *F02M 21/047* (2013.01); *F02M 25/0722* (2013.01);
(Continued)

(58) Field of Classification Search
CPC ........ Y02T 10/32; F02B 31/04; F02M 21/047

USPC .................................. 123/518, 521, 525, 539
See application file for complete search history.

(56) References Cited

U.S. PATENT DOCUMENTS

| | | | | |
|---|---|---|---|---|
| 3,896,670 | A | * | 7/1975 | Converse et al. .......... 73/861.63 |
| 4,026,253 | A | * | 5/1977 | Nishino et al. ................ 123/579 |
| 4,953,516 | A | * | 9/1990 | van der Weide et al. ..... 123/527 |
| 5,311,849 | A | * | 5/1994 | Lambert et al. ............... 123/337 |
| 5,345,918 | A | * | 9/1994 | Lambert ....................... 123/527 |
| 5,517,965 | A | * | 5/1996 | Notsu et al. ................... 123/352 |
| 5,797,379 | A | | 8/1998 | Sharples |
| 6,092,364 | A | | 7/2000 | Stellwagen |
| 6,990,964 | B2 | | 1/2006 | Ströhle |

(Continued)

FOREIGN PATENT DOCUMENTS

| | | |
|---|---|---|
| DE | 4137573 A | 5/1993 |
| DE | 10324706 B3 | 12/2004 |

(Continued)

OTHER PUBLICATIONS

RMG; Gasmischer RMG 980, Ebersberg, 1998—Firmenschrift.

*Primary Examiner* — Noah Kamen
*Assistant Examiner* — Long T Tran
(74) *Attorney, Agent, or Firm* — Lucas & Mercanti, LLP; Klaus P. Stoffel

(57) ABSTRACT

A gas mixer for mixing a first gas and a second gas, including a gas housing, a Venturi tube, a flow body for the first gas arranged in the Venturi tube to form a mixing gap, an inflow tube connected to the Venturi tube, to an inflow opening to the Venturi tube for the second gas, and an actuating element for varying the inflow cross section of the inflow opening. The actuating element has a first and a second actuating part which restrict the inflow cross section. The first actuating part is a first gas housing part and the second actuating part is a second gas housing part. At least one of the gas housing parts forms part of the Venturi tube and/or of the inflow tube At least one of the gas housing parts can be moved with respect to another and has a rotor of a linear motor.

15 Claims, 3 Drawing Sheets

(51) Int. Cl.
*F02M 21/04* (2006.01)
*F02M 25/07* (2006.01)
*B01F 5/04* (2006.01)
*B01F 3/02* (2006.01)
*F23D 14/64* (2006.01)
*F02D 19/02* (2006.01)

(52) U.S. Cl.
CPC ............... *B01F 5/0428* (2013.01); *B01F 3/02* (2013.01); *F23D 14/64* (2013.01); *F02D 19/023* (2013.01); *Y02T 10/121* (2013.01); *Y02T 10/32* (2013.01); *B01F 2005/0436* (2013.01)
USPC .......................... 123/518; 123/521; 123/525

(56) References Cited

U.S. PATENT DOCUMENTS

| | | | | |
|---|---|---|---|---|
| 2003/0111063 | A1* | 6/2003 | Iida | 123/527 |
| 2006/0225715 | A1* | 10/2006 | Ohashi et al. | 123/590 |
| 2008/0290531 | A1* | 11/2008 | Nickels et al. | 261/52 |
| 2009/0088950 | A1* | 4/2009 | Fisher et al. | 701/103 |
| 2009/0271097 | A1* | 10/2009 | Kasai et al. | 701/113 |

FOREIGN PATENT DOCUMENTS

| | | |
|---|---|---|
| EP | 0898064 A1 | 2/1999 |
| EP | 2016994 A | 1/2009 |
| EP | 2258983 A2 | 12/2010 |
| GB | 154920 A | 4/1922 |
| WO | 9859165 | 12/1998 |

* cited by examiner

GAS MIXER, GAS MIXING SYSTEM, GAS ENGINE

The present application is a 371 of International application PCT/EP2012/002081, filed May 15, 2012, which claims priority of DE 10 2011 076 106.3, filed May 19, 2011, the priority of these applications is hereby claimed and these applications are incorporated herein by reference.

BACKGROUND OF THE INVENTION

The invention pertains to a gas mixer. The invention also pertains to a gas mixing system and to a gas engine.

A gas mixer of the type indicated above is used to mix a first gas and a second gas together. Especially in the case of a gas engine, the first gas is in the form of combustion air, i.e., fresh air or a lean air/gas mixture, and the second gas is in the form of a fuel gas. The gas mixer provides an air/fuel gas mixture, consisting of combustion air and the fuel gas mixed with it, suitable for the gas engine. Especially in the case of a lean gas engine, it has been found important to adjust the lambda ratio (i.e., the ratio of fuel gas to combustion air) on the basis of, for example, the power demand of the lean gas engine. A gas mixer can be found in EP 0 898 064 A1 in the form of a venturi mixer, for example, which is installed upstream of a lean gas engine in a gas mixing system for adding fuel gas to, and mixing it with, combustion air or a lean gas mixture.

In the case of a venturi mixer, it is possible in principle to work with different cross sections to increase the mixing quality of the air/fuel gas mixture; in EP 2 258 983 A2, for example, a venturi mixer with a mixing section with different cross sections is described. GB 154,920 describes a gas mixer of the above-mentioned type with a movable displacement body in a venturi tube, as a result of which the size of a mixing gap can be adjusted to different values.

From the brochure dating from April 1988 concerning the RMG980 gas mixer from the company RMG, a gas mixer is known which comprises a fixed displacement body in a venturi tube, representing a comparatively robust design similar to the prior art shown in FIG. 1. The intake cross section for a second gas, combustion gas in particular, is formed here by first and second gas housing parts, which form the boundaries of the intake cross section. As described in the prospectus, the fixed intake cross section between the fixed gas housing parts determines the mixing ratio between the first gas (air or lean gas mixture in the venturi tube) and a second gas (fuel gas in the intake tube).

It is desirable for the intake cross section to be adjustable to different values. An adjustable part which forms the boundary of the intake cross section and which can be actuated as desired, however, can be extremely complex.

The drive for a control element for the adjustable parts forming the boundary of the intake cross section can also be complicated. Angular gears and other types of mechanical force-transmitting drives advanced by gear wheels are more susceptible to wear than other types, which means that the accuracy or speed with which adjustments can be made always deteriorates over the life of the drive.

EP 2 016 994 A describes a gas mixer of the above-mentioned type, in which a venturi tube comprises inlets for fuel gas in the area of a narrowed cross section; control elements are able to change these inlets during the mixing process. The control elements comprise here a control sleeve surrounding the narrowed cross section, the sleeve being provided with fuel control openings. Shifting the positions of the fuel control openings with respect to the inlet openings for the fuel gas changes the size of the cross sections through which the fuel gas can pass. The narrowed cross section is formed by a displacement body arranged in the venturi tube. Admittedly, it is possible by this means to achieve a comparatively precise adjustment of the open cross section; however, the corresponding automatic control process takes a comparatively long time, and/or the maximum allowable actuating force is limited. The mechanical design of the previously mentioned control elements is also comparatively complicated, which means that the accuracy of the adjustments can suffer over the life of the gas mixer as a result of a wear, and a loss of performance can also be caused by the accumulation of dirt.

It would be desirable to have a drive and a control element which can be realized in a gas mixer with comparatively few restrictions and which at the same time allow the control element which determines the intake cross sections to be positioned robustly, rapidly, and comparatively accurately over a long service life.

SUMMARY OF THE INVENTION

This is the point at which the invention enters the picture, the goal of which is to provide a gas mixer which is superior to the prior art. In particular, the control element is to be provided with a comparatively robust design. More specifically, the control element is to operate comparatively rapidly and nevertheless be positionable with high accuracy. The goal of the invention is also to provide a corresponding gas mixing system incorporating the gas mixer and to provide a suitable gas engine, especially a lean gas engine.

The goal pertaining to the gas mixer is achieved by a gas mixer of the type described above, wherein it is provided according to the invention that the first control part is formed as a first gas housing part and the second control part is formed as a second gas housing part, wherein at least one of the gas housing parts forms part of the venturi tube and/or of the intake tube, and at least one of the gas housing parts is movable with respect to the other part, wherein the movable gas housing part comprises the armature of a linear motor.

In more concrete terms, it is provided that the first and/or the second gas housing part is able to move with respect to the other part, thus forming the "moving" part of the linear motor. For this purpose, suitable magnetic field-producing means can be provided in or on the first and/or the second gas housing part, e.g., one or more permanent magnets, coils, etc., which are suitable for forming an armature which can interact with a stator.

The invention is based on the idea that, because the gas housing parts are used as the control element, a gas mixer of the type described above is already of comparatively robust design and can be operated over a long life without significant wear or dirt accumulation. A drive for a control element formed by first and second gas housings parts forming the boundaries of the intake cross section, however, was found to be in need of improvement. The invention has recognized that, to adjust the intake cross section, at least one of the gas housing parts must be movable with respect to the other part. The invention has also recognized that the best way to move a gas housing part is in the direction of the longitudinal axis of the venturi tube. To this extent, the invention has recognized that the concept of linear movement offers basic advantages over the concept of rotational movement for driving or moving the control element. The invention therefore provides that the movable gas housing part comprises the armature of a linear motor. The invention has recognized that a linear motor can be implemented comparatively easily to achieve the relative movement of gas housing parts forming the boundaries of an intake cross section.

In addition, the concept of the invention takes advantage of the properties of the linear motor which make it possible to adjust the intake cross section precisely and yet flexibly and in a highly dynamic fashion. The invention has recognized that a linear motor can be implemented especially effectively for this function. In this way, a control element is realized which can be positioned flexibly and quickly but nevertheless precisely and which also offers comparatively high actuating forces. Thus an especially robust gas mixer which can be adjusted in both a precise and highly dynamic manner is realized.

Advantageous elaborations of the invention can be derived from the subclaims, which give the details of other preferred ways in which the concept of the invention can be elaborated to offer additional advantages within the scope of the stated goal.

A dome on the inside surface of the venturi tube preferably forms the boundary of a diffusor space located in front of the orifice of the intake tube. The dome forms one wall of the venturi tube and also has the effect of constricting the mixing gap. It is advantageous for the intake opening comprising the intake cross section to be arranged at the highest point of the dome.

In a first modification, it is advantageous for the movable gas housing part to be designed as a ring-shaped part, which forms the boundary of a ring-shaped dome extending around an inside circumference of the venturi tube.

In a second modification, it is advantageous for a movable gas housing part to be formed on one side, i.e., on a first side, of the venturi tube, and for another movable gas housing part to be formed on the other side, i.e., on a second side of the venturi tube.

The displacement body preferably has an elongated shape. In particular, the longer axis of the displacement body extends along the longitudinal axis of the venturi tube. It is advantageous for a mixing gap to be formed transversely to the longitudinal axis of the venturi tube and transversely to the longer axis of the displacement body. This arrangement has proven to be especially advantageous with respect to the inflow of the first gas, wherein thorough mixing of the first and second gas can be achieved at the same time.

In a first variant elaborating the concept of the invention, it can be provided that only the first gas housing part can move with respect to the second, fixed, gas housing part, and in particular that it can be shifted along the longitudinal axis by the linear motor. Conversely, it is also possible in similar fashion for only the second gas housing part to be able to move with respect to the first, fixed, gas housing part, and in particular that it can be shifted along the longitudinal axis by the linear motor. It is advantageous for the "first" gas housing part to be the first gas housing part with respect to the direction in which the first gas flows and thus the first part with which the gas makes contact. This offers the advantageous result of ensuring that the main flow resistance is absorbed by the fixed housing part.

In an especially preferred elaboration of the above-described first variant, it is has been found advantageous for the fixed gas housing part to establish the longitudinal position of the intake opening. The size of a mixing gap in the venturi tube is then advantageously determined essentially as the distance between the intake cross section and the displacement body. In the case of the previously described first variant, what we have is to this extent a gas mixer in which the intake cross section is variable but the mixing gap itself comprises a fixed, free cross section. This leads to the advantage that a comparatively fixed pressure loss can be set for the constriction at the mixing gap. As a result, the gas mixer can be operated in comparatively stable fashion with good mixing results even under varying inflow conditions of the second gas. It has been found to be especially preferred within the scope of the first variant that the longitudinal position be established in the area of a section extending parallel to the longitudinal axis of the displacement body. The section extending parallel to the longitudinal axis of the displacement body is preferably part of an approximately cylindrical part of the displacement body. It is therefore possible to mix the two components together with comparatively low mixing resistance.

In a second, also preferred elaborative variant, it has been found to be advantageous for both the first gas housing part and the second gas housing part to be movable and for each of these two gas housing parts to be movable with respect to the other. This offers the advantage that the longitudinal position of the mixing gap can be adjusted as desired along the longitudinal axis of the venturi tube. Thus, for example, the first gas housing part and the second gas housing part can be moved "backward" with respect to the flow direction along the longitudinal axis. The mixing gap can also be adjusted to a more forward position by shifting the two gas housing parts "forward" along the longitudinal axis.

Within the scope of an especially preferred elaboration, the size of the mixing gap, defined essentially as the distance between the intake cross section and the displacement body, is established by means of the variable longitudinal positioning of the intake opening relative to the venturi tube. In this way, it is possible to vary not only the intake cross section but also the cross section of the mixing gap. This can be advantageous when it is desired to vary the pressure loss in the mixing section along the displacement body.

It has been found to be especially advantageous, furthermore, for the longitudinal position to be established in the area of a section extending transversely to the longitudinal axis of the displacement body. Thus the cross section of the mixing gap will vary as a function of the absolute longitudinal position of the intake cross section. In particular, for this purpose, a corresponding part of the displacement body is designed as a pitifully tapering part. As a result of the shape of the displacement body, which is therefore already flow-promoting and favorable to the mixing action, the mixing gap becomes increasingly larger as the intake cross section moves "backward".

Within the scope of an especially preferred design elaboration of the gas mixer, the first and/or the second gas housing part is part of the wall of the venturi tube. In an especially preferred manner, the wall is, for this purpose, designed in the form of a dome, which extends over an orifice of the intake tube and projects into the interior space of the venturi tube. A suitable diffusor effect for the second gas is thus achieved between the orifice of the intake tube and the intake cross section in the dome.

It has been found to be especially advantageous for a fixed gas housing part to form a part of the wall of the venturi tube extending transversely to a longitudinal axis of the venturi tube. It is advantageous for the part of the wall extending transversely to the longitudinal axis of the venturi tube to be designed as the projecting part of the dome. For example, it has proven to be advantageous—both in the case of the previously mentioned first variant and in the case of the second variant—for a fixed gas housing part to form the inflow surface of the dome and for a fixed gas housing part to form the outflow surface of the dome. In the case of the previously mentioned first variant, there is preferably only one movable gas housing part, which can move between the forward, fixed, gas housing part and the rear, fixed, gas housing part. In the case of the previously mentioned second variant, there are two movable gas housing parts, which can move axially between the previously mentioned forward fixed gas housing part and the rear fixed gas housing part. The movement of the movable gas housing part is thus subjected to comparatively little load from flow resistances, and these parts can therefore be moved back and forth by the linear motor with low friction and with only a comparatively small amount of force. This is advantageous in terms of the rapid and yet accurate positioning of the movable gas housing parts and thus advantageous with respect to the rapid and precise adjustability of the intake cross section.

In particular, a movable gas housing part can form only a part of the wall of the venturi tube, namely, a part extending parallel to a longitudinal axis of the venturi tube. As a result, the flow resistance encountered by a movable gas housing part is virtually negligible.

The stator of the linear motor can be arranged opposite the armature in basically any suitable position available within the scope of the design constraints. It has been found to be especially preferable for the stator of the linear motor to be arranged on a housing part not forming a boundary of the intake cross section. This makes it possible to install the linear motor in the intake area in such a way that it is comparatively well protected from dirt and the like. It is especially preferred that the stator of the linear motor be formed on the intake tube. The linear motor can thus be installed in a comparatively space-saving manner.

Each of the movable gas housing parts preferably comprises an armature of a linear motor.

Exemplary embodiments of the invention are now described below on the basis of the drawings. These are not necessarily intended to represent the exemplary embodiments in a manner true to scale; instead, the drawings are rendered in schematic and/or slightly distorted form, where useful for explanatory purposes. For information supplemental to the teachings which can be derived directly from the drawings, reference is made to the relevant prior art. In this regard it must be kept in mind that many different modifications and changes pertaining to the shape and details of an embodiment are possible without departing from the general idea of the invention. The features of the invention disclosed in the description, in the drawings, and in the claims can be essential, both individually and in any desired combination, to the elaboration of the invention. In addition, all combinations of two or more of the features disclosed in the description, in the drawings, and/or in the claims fall within the scope of the invention. The general idea of the invention is not limited to the exact shape or details of the preferred embodiment described and illustrated below or limited to an object which would be limited in comparison to the object specified in the claims. Where dimensional ranges are given, values lying within the stated limits are also to be considered disclosed as limit values and are usable and claimable in any way desired. For the sake of simplicity, the same reference numbers are used in the following for identical or similar parts or parts with identical or similar function.

Additional advantages, features, and details of the invention can be derived from the following description of the preferred exemplary embodiments and from the drawings:

DETAILED DESCRIPTION OF THE INVENTION

Figure 1:
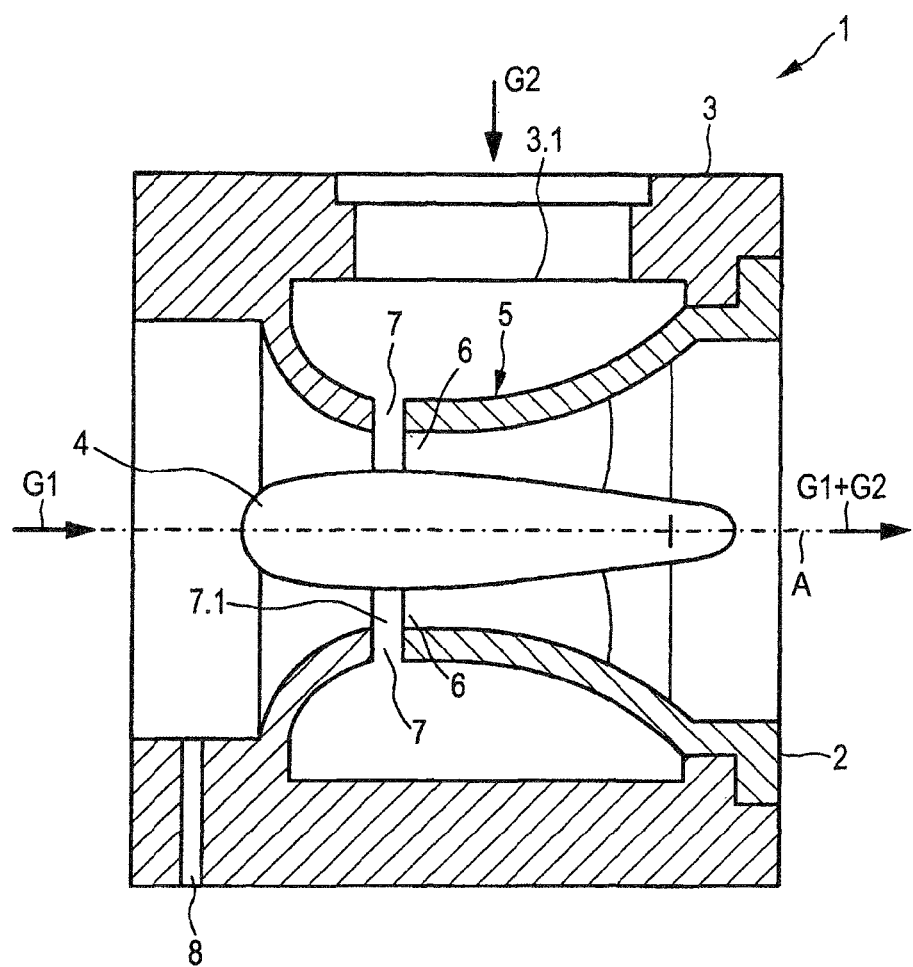
FIG. 1 shows a gas mixer as known from the prior art on the basis of the brochure RMG980 from the company RMG.

FIG. 1 shows a cross section of a possible design of a gas mixer 1 basically known from the prior art. The gas mixer 1 is formed by a venturi tube 2 and an intake tube 3, which fit together in an approximately T-shaped manner. A displacement body 4 is permanently positioned in the venturi tube 2. The wall of the venturi tube 2, furthermore, is bent inward along an inside circumference to form a dome 5 extending over the orifice 3.1 of the intake tube 3. Between the dome 5 and the displacement body 4, therefore, a ring-shaped mixing gap 6 is formed, which is symmetric to the longitudinal axis A of the venturi tube 2. At approximately its smallest dimension, the dome 5 comprises an intake orifice 7, which is in the form of a ring-shaped opening allowing the gas to enter from the intake tube 3. An opening 8 in the venturi tube can be used to measure the pressure.

The gas mixer 1 designed in this way according to the venturi principle can be connected to a gas line for a first gas G1, which, as it flows through the gas mixer 1, is forced to accelerate in the area of the mixing gap 6, and thus the static pressure in the area of the mixing gap is lowered versus the pressure relationships in the intake tube 3. Thus a second gas G2 coming from the intake rube 3 is drawn first into the diffusor space bounded by the dome 5, then through the intake opening 7, and finally into the venturi tube 2. The second gas G2 thus mixes with the first gas G1 in the area of the trailing end of the displacement body 4. According to the venturi principle, the mixing ratio between the first gas G1 and the second gas G2 basically follows an exponential curve or possibly a linear approximation of such a curve, which is determined essentially by the intake cross section 7.1 of the intake opening 7. It should be possible to adjust the intake opening in a comparatively precise and highly flexible manner with a comparatively high level of dynamic behavior.

For the rest, the displacement body 4 can be designed as a function of the flow conditions in order to achieve, first, the best possible mixing of gases G1 and G2 and, second, the quickest possible reestablishment of homogeneous flow conditions. According to the prior art, however, the mixing ratio between the first and second gases G1, G2 is set by the use of suitable flow rate valves.

The concept of the invention is based on the recognition that a way should be found to design the intake opening 70 so that it can be adjusted in a comparatively precise and highly flexible manner with a comparatively high level of dynamic behavior. The concept achieves this goal with a linear motor 10, 10a, 10b, as explained below.

Figure 2:
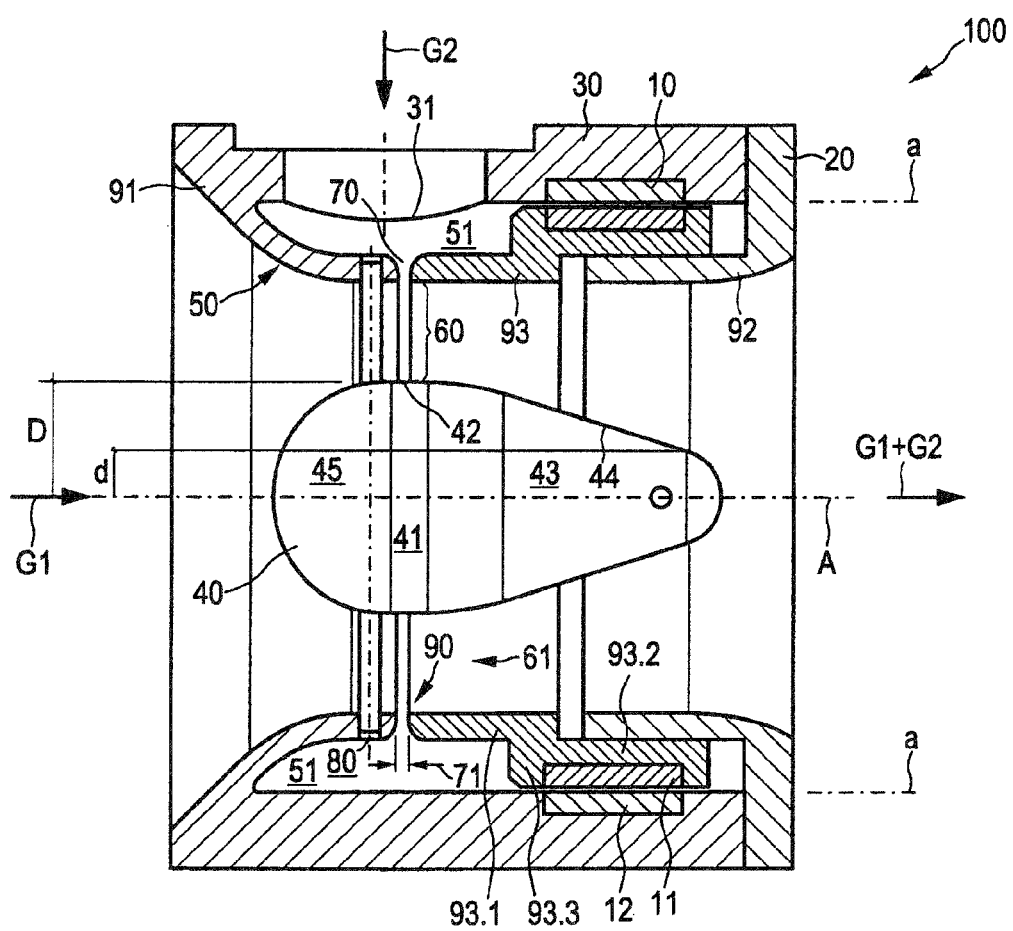
FIG. 2 shows a cross section of the design of a gas mixer according to a first preferred embodiment.

By way of example, FIG. 2 shows a first gas mixer 100, based essentially on the concept of the first elaborative variant.

The gas mixer 100 comprises a venturi tube 20 and an intake tube 30, which fit together in an approximately T-shaped manner. The venturi tube 20 extends along a longitudinal axis A and comprises a fixed displacement body 40, which is arranged symmetrically to the longitudinal axis A with its own lengthwise axis collinear to the longitudinal axis A. The walls of the venturi tube 20 form a dome 50, which projects into the interior space of the venturi tube 20. Between the dome 50 and the displacement body 40, therefore, a mixing gap 60 is formed, which extends in ring-shaped manner around the displacement body 40 between the outside surface of the displacement body 40 and the outside surface of the dome 50, this being at the point of the shortest distance between the dome 50 and the displacement body 40. An opening 80, furthermore, is formed in the dome 50. This serves primarily for the attachment of the displacement body 40. As an opening, however, it can also serve to equalize the pressure or to accept a measurement probe.

Over the orifice 31 of the intake tube 30, therefore, a ring-shaped diffusor space 51 extending around the displacement body 40 is formed; this space is bounded by the dome 50. An intake opening 70 in the dome 50 has an intake cross section 71, which, in the present case, can be adjusted to different values, whereas, in the case of the first embodiment shown in FIG. 2, the cross section 61 of the mixing gap 60 is fixed. The dimensions of the cross sections 61, 71 are basically dependent on the overall size of the gas mixer 100, 200. Concretely in the present case, the cross section 61 is to be designed with a size of, for example, approximately 40 mm, whereas the intake cross section 71 can be adjusted as desired over a range extending, for example, from 0 to 15 mm. These dimensions have been found to be especially preferred for a displacement body 40 with a ratio between the largest and the smallest diameter D/d of approximately 120 mm/80 mm.

In this way, the gas mixer 100 shown in FIG. 2 can mix together a first gas G1—here in the form of fresh air—and a second gas G2—here in the form of a fuel gas such as natural gas, biogas, or some other methane-containing gas—to form an air-gas mixture G1+G2 in an especially advantageous manner according to the venturi principle explained on the basis of FIG. 1.

The intake cross section 71 of the intake opening 70 can, in the present case, be adjusted by a second, movable, gas housing part 93, which can be moved back and forth between a first fixed gas housing part 91 and a second fixed gas housing part 92 in order to adjust the intake cross section 71 of the intake opening 70 as needed. In the present case, the first fixed gas housing part 91 is formed by the curved part of the dome 50 on the inflow side. The second fixed gas housing part 92 is formed by the curved part of the dome 50 on the outflow side. The movable gas housing part 93 comprises an outside surface which extends exclusively parallel to the longitudinal axis A and which can be flush with the initially adjacent outside surfaces of the first and second fixed gas housing parts 91, 92. The movement of the movable gas housing part 93 is therefore hardly affected at all by the pressure or similar flow resistance of the flow of the first gas G1 or of the gas mixture G1+G2 in the venturi tube 20. The movable gas housing part 93 can therefore be moved in a comparatively resistance-free manner—and thus, in practice, freely.

In the present case, therefore, a control element 90 is formed, by means of which the intake cross section 71 of the intake opening 70 can be set to different values, wherein the control element 90 is formed by the first, fixed, gas housing part 91 and the movable gas housing part 93. The two gas housing parts 91, 93 form part of the walls of the venturi tube 20, that is, concretely in the present case, part of the walls of the dome 50. In the present case, the movable gas housing part 93 is actuated by a drive in the form of a linear motor 10. In concrete terms, an armature 11 of the linear motor 10 is formed for this purpose on the movable gas housing part 93, whereas the stator 12 of the linear motor is attached to the material of the walls or in the walls of the intake tube 30 (on one side) and/or of the venturi tube 20 (on the other side). When power is supplied to the linear motor 10, the movable gas housing part 93 can thus be moved back and forth—in accordance with the position which it is intended to occupy—between the first and the second fixed gas housing parts 91, 92, this movement occurring exclusively in the direction of the longitudinal axis A. The axis a of the armature 11 or of the multiple armatures 11 of the one or more linear motors 10, which armature extends or which armatures extend around the cylindrical circumference of the gas housing part 93, thus extends parallel to the longitudinal axis A of the venturi tube 20. Of course, the cross-sectional view of FIG. 2 shows only one cross section through what is in fact an arrangement of several linear motors 10 with the overall shape of a ring or an arrangement consisting of a single ring-shaped linear motor 10 comprising several elements forming armatures 11 and stators 12. Such measures can be implemented in a wide variety of ways to realize a suitable linear motor system consisting of a single or of several linear motors 10 without deviating from the generally claimed concept of the invention according to the claims.

To implement the design, the movable glass housing part 93 comprises, in a cross-sectional side view, a more-or-less Z-shaped cross section of an otherwise ring-shaped form. A first leg 93.1 of the Z-shaped cross section (or a first ring-shaped component with a smaller cross section) forms part of the walls of the dome 50. A second leg 93.2 of the Z-like cross section (or a second ring-shaped component with a larger cross section) is the carrier of the armature 11 of the linear motor 10. The two cross-sectional parts 93.1, 93.2 (ring-shaped part of smaller diameter and ring-shaped part of larger diameter) are integrally connected by a part 93.3 essentially perpendicular to the longitudinal axis a. The two legs 93.1, 93.2 of the Z-shaped cross section are aligned along the axis a and also along the longitudinal axis A of the venturi tube. So that the position of the movable gas housing part 93 can be shifted, the diffusor space 51 enclosed by the dome 50 is extended as appropriate by a rear, fixed gas housing part 92 of the dome 50. The movable gas housing part 93 thus moves back and forth in the diffusor space 51, either enlarging it while increasing the intake cross section 71 or shrinking it while decreasing the intake cross section 71.

The first embodiment just described is suitable in an especially preferred way for supplemental adjustment of the mixing ratio of the first gas G1 to the second gas G2 by way of the intake cross section 71.

In addition, the first embodiment shown in FIG. 2 features a displacement body 40 with an advantageously designed contour. This comprises an approximately cylindrical part 41 extending along the longitudinal axis A and located longitudinally at the position of the intake opening 70, the outside surface 42 of this cylindrical part being parallel to the longitudinal axis A. As a result, it is guaranteed, first, that a constant cross section 61 of the mixing gap 60 remains in effect over the entire range of variation of the intake cross section 71. It is only beyond the extent to which the movable gas housing part 93 can move that the displacement body 40 has a part 43 which tapers down in an approximately conical manner with a surface 44 extending transversely to the longitudinal axis A.

Figure 3:
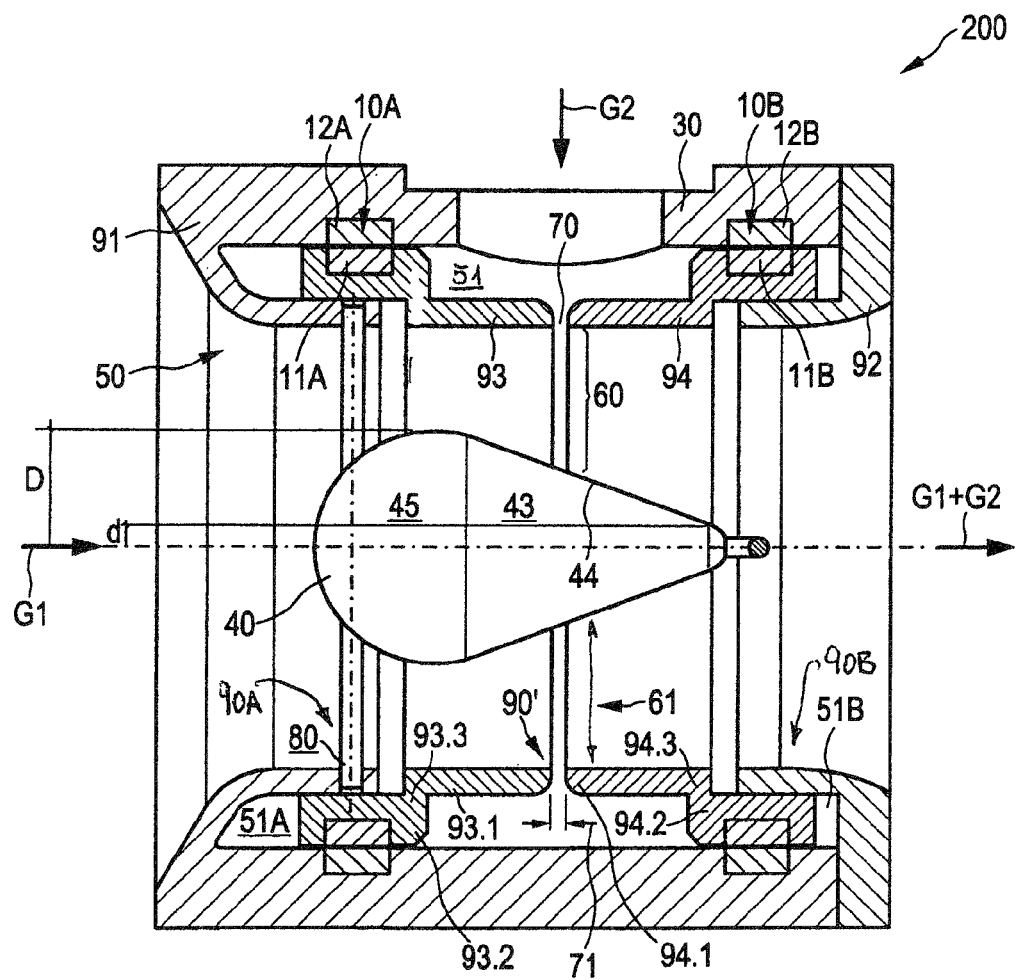
FIG. 3 shows a cross section of a design of a gas mixer according to a second preferred embodiment.

FIG. 3 shows a gas mixer 200, which adheres essentially to the concept of the second variant. This mixer also comprises a control element 90', designed according to the concept of the invention, except that, in contrast to the variant of the gas mixer 100 of FIG. 2, it has sub-control elements 90a, 90b, which will be explained below. For the rest, the same reference numbers as those used in FIG. 2 are assigned to identical or similar parts or parts of identical or similar function, in which respect reference is made to the description of FIG. 2.

In the present case as well, a control element 90' is formed out of gas housing parts forming the walls of a dome 50. In the present case, however, the control element 90' consists exclusively of movable gas housing parts, namely, a first movable gas housing part 93 and a second movable gas housing part 94. The two movable gas housing parts 93, 94 have the overall shape of a ring with an approximately Z-shaped cross section, as described previously on the basis of FIG. 2. Here the parts of the ring with the smaller diameter face the variably adjustable intake opening 70. Each of the parts of the ring with the larger cross section carries a stator 11a, 11b of a linear motor 10a, 10b. The parts of the ring with the smaller cross section are designated 93.1 and 94.1. The parts of the ring of larger cross section are designated 93.2 and 94.2. The sections connecting the two parts of the ring and extending essentially perpendicular to the longitudinal axis A are designated 93.3 and 94.3.

Each of the two movable gas housing parts 93, 94 is able to move between a first fixed gas housing part 91 and a second fixed gas housing part 92. As a result, the intake cross section 71 of the intake opening 70 between the ring sections 93.1 and 94.1 can be shifted to different positions. The ring sections 93.2, 94.2 fit into grooves formed essentially by the fixed gas housing parts 91, 92 in the diffusor space 51, which grooves serve as guide elements; they therefore also serve as guide elements for the carriers of the armatures 11a, 11b of the first and second linear motors 10a, 10b. Parts of the guide groove surfaces are formed by the stators 12a, 12b of the linear motors 10a, 10b. In a manner similar to the embodiment described on the basis of FIG. 2, therefore, the diffusor space 51 is extended to form guide grooves in cooperation with the first and second fixed gas housing parts 91, 92. The guide groove 51a serves here to guide the section 93.2 of larger cross section, and the guide groove 51b serves to guide the ring section 94.2 of larger cross section.

Basically, the linear motors 10a, 10b are always under power. The intake cross section 71 can be adjusted in different ways. First, the linear motor 10b can remain idle while the linear motor 10a is actuated, that is, supplied with power, and supplied also with a specified position value. In this way, the movable gas housing part 94 remains in the same position, whereas the other movable gas housing part 93 is moved relative to the gas housing part 94 in accordance with the specified position value and thus increases or decreases the size of the intake cross section 71.

The opposite procedure with reversal of the roles of the linear motors 10a and 10b—i.e., linear motor 10b is actuated while linear motor 10a remains idle—is also possible.

Above all, however, in contrast to the first embodiment of FIG. 2, the gas mixer 200 of FIG. 3 offers the possibility not only of adjusting the size of the intake cross section 71 but also of adjusting the cross section 61 of the mixing gap 60 to different values. What this basically achieves is that the pressure loss in the mixing section and thus the suction effect on the second gas G2 in the intake tube 30 can be set to the desired value. In the present case, this can be achieved because the intake opening 70 is arranged longitudinally at a point on the longitudinal axis A which lies in the area of a section 43 extending transversely to the longitudinal axis of the displacement body 40. The displacement body 40 comprises here a surface 44 extending transversely to the longitudinal axis to form a more-or-less conically tapering part 43. A cylindrical part—part 41 with surface 42 in the case of the gas mixer 100—is lacking here. The inflow part 45 directly adjoins the conically tapering part 43.

In the end result, the control element 90' of the gas mixer 200 is formed with a first movable gas housing part 93 and a second movable gas housing part 94, wherein the two gas housing parts 93, 94 form the boundaries of the intake cross section 71 and simultaneously are part of the walls of the dome 50. The movable gas housing parts 93, 94 are each individually drivable by their own linear motors 10a, 10b; that is, they can be driven separately, alone, or both simultaneously, depending on the positions they are intended to occupy. When the gas housing parts 93, 94 are moved simultaneously, the intake opening 70 can be positioned at any desired point on the longitudinal axis. A following relative movement—whether this be brought about by both linear motors 10a,10b or by only one of them—can then set the intake cross section 71 to the desired value.

LIST OF REFERENCE NUMBERS 1, 100, 200 gas mixer
10, 10a, 10b linear motor
11, 11a, 11b armature
12, 12a, 12b stator
2, 20 venturi tube
3, 30 intake tube
31 orifice
4, 40 displacement body
42 outside surface
43 tapering part
45 inflow-side part
5, 50 dome
51 diffusor space
6, 60 mixing gap
61 cross section
7, 70 intake opening
7.1, 71 intake cross section
8, 80 opening for attachment of the displacement body 4, 40
G1 first gas
G2 second gas
G1+G2 air-gas mixture
90, 90'; 90a, 90b control element
91, 92, 93 gas housing part
93.1, 93.2, 93.3,
94.1, 94.2 leg, ring part, ring section
A, a longitudinal axis

The invention claimed is:

1. A gas mixer for mixing together a first gas and a second gas, comprising:
 a gas housing;
 a venturi tube;
 a displacement body for the first gas, the displacement body being arranged in the venturi tube to form a mixing gap;
 an intake tube connected to the venturi tube and providing an intake opening to the venturi tube for the second gas; and
 a control element by which an intake cross section of the intake opening can be adjusted to different values, wherein the control element comprises a first and a second control part forming boundaries of the intake cross section, wherein the first control part is formed as a first gas housing part, and the second control part is formed as a second gas housing part, wherein at least one and/or of the intake tube, wherein at least one of the gas housing parts is movable with respect to the other gas housing part, and wherein the movable gas housing part includes an armature of a linear motor.

2. The gas mixer according to claim 1, wherein the displacement body extends along a longitudinal axis of the venturi tube, and the mixing gap is formed transversely to the longitudinal axis.

3. The gas mixer according to claim 1, wherein only the first gas housing part is movable with respect to the second, fixed, gas housing part, or only the second gas housing part is movable with respect to the first, fixed, gas housing part.

4. The gas mixer according to claim 3, wherein the fixed gas housing part establishes a longitudinal position of the intake opening, and the size of the mixing gap is established substantially as a distance between the intake cross section and the displacement body.

5. The gas mixer according to claim 4, wherein the longitudinal position is established in an area of a section of a substantially cylindrical part of the displacement body extending parallel to a longitudinal axis of the displacement body.

6. The gas mixer according to claim 1, wherein both the first and the second gas housing parts are movable, and the first and second gas housing parts are each movable with respect to the other.

7. The gas mixer according to claim 1, wherein a size of the mixing gap, which is substantially a distance between the intake cross section and the displacement body, is established by varying a longitudinal position of the intake opening relative to the venturi tube.

8. The gas mixer according to claim 7, wherein the longitudinal position is established in an area of a section of a substantially conically tapering part of the displacement body extending transversely to a longitudinal axis of the displacement body.

9. The gas mixer according to claim 1, wherein the first and/or the second gas housing part forms part of a wall of the venturi tube, wherein the wall forms a dome that covers an orifice of the intake tube and projects into an interior of the venturi tube.

10. The gas mixer according to claim 1, wherein a movable gas housing part forms only part of a wall of the venturi tube, which part is parallel to a longitudinal axis of the venturi tube.

11. The gas mixer according to claim 1, wherein a fixed gas housing part forms part of a wall of the venturi tube, which part extends transversely to a longitudinal axis of the venturi tube.

12. The gas mixer according to claim 1, wherein a stator of the linear motor is arranged on a gas housing part not forming a boundary of the intake cross section.

13. The gas mixer according to claim 12, wherein the stator of the linear motor is formed on the intake tube.

14. The gas mixer according to claim 1, wherein each of the movable gas housing parts comprises an armature of a linear motor.

15. A gas mixing system or gas engine, comprising a gas mixer according to claim 1.

* * * * *